June 9, 1925.
B. MacDONALD
1,541,160
EDGE SPACER FOR CULTIVATED GRASS PLOTS
Filed June 30, 1924
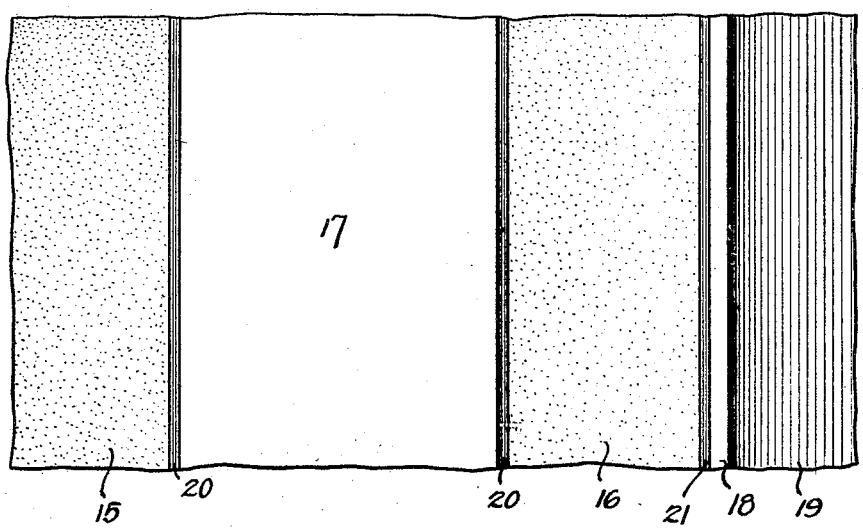
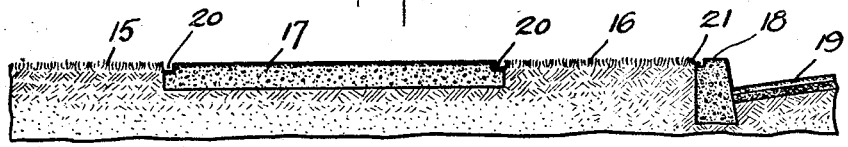
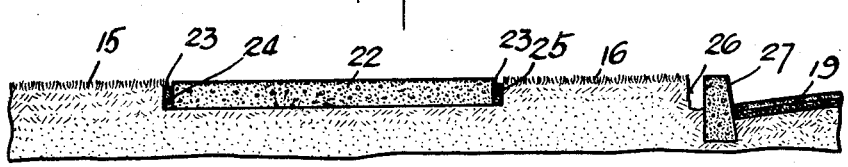
Inventor
BERNARD MAC DONALD
By Munn & Co.
Attorneys Patented June 9, 1925.

1,541,160

UNITED STATES PATENT OFFICE.

BERNARD MacDONALD, OF SOUTH PASADENA, CALIFORNIA.

EDGE SPACER FOR CULTIVATED GRASS PLOTS.

Application filed June 30, 1924. Serial No. 723,300.

*To all whom it may concern:*

Be it known that I, BERNARD MacDonald, a citizen of the United States, and a resident of South Pasadena, in the county of Los Angeles and State of California, have invented certain new and useful Improvements in Edge Spacers for Cultivated Grass Plots, of which the following is a specification.

In the residence districts of towns and cities and at country homes where cement curbings, walks and driveways of present design are constructed contiguous to lawns or cultivated grass plots, the growing grass spreads over the marginal edges of such cement construction, and it is difficult, laborious and expensive to keep the grass trimmed so as to maintain the much-to-be-desired clean and well defined marginal line between the cement construction and the grass areas above referred to.

It is a purpose of my invention to obviate this difficulty and to facilitate the work of trimming the grass along the margin of cement curbs, walks or driveways by providing an edge spacer which, when applied to the already existing cement curbings, pavements or driveways, or when incorporated in new cement construction of the same kind, provides simple, labor-saving and efficient means, by the use of which the margins or edges of lawns or other cultivated grass plots contiguous to such cement construction can be more neatly and more economically trimmed than has been heretofore possible.

I will describe only two forms of edge spacers embodying my invention and will then point out the novel features thereof in claims.

In the accompanying drawings—

Figure 1 is a fragmentary view showing in top plan one form of edge spacer embodying my invention as applied to a cement pavement and curbing;

Figure 2 is a vertical sectional view of Figure 1;

Figure 3 is a view similar to Figure 2, showing another form of edge spacer embodying my invention.

Referring specifically to the drawings, in which similar reference characters refer to similar parts, and particularly to Figures 1 and 2, 15 and 16 designate cultivated grass plots, the former constituting a lawn and the latter a parking, with a cement pavement 17 interposed between the two, and a curbing 18 interposed between the parking 16 and a street 19. As clearly shown in Figure 2, the marginal edges of the pavement 17 are reduced in thickness to provide at the upper surface thereof grooves or recesses 20 which are coextensive in length with the pavement. With the pavement in applied position between the grass plots 15 and 16, these recesses or grooves 20 serve to space the edges of the upper surface of the pavement from the edges of the grass plots, and in doing so provide channels or grooves in which a suitable grass trimmer can be operated to trim the grass along the edges of the plots and thus provide a clear line of demarcation between the pavement and the plots. The bottoms of the channels or recesses 20 are disposed below the surface of the grass plots, so that should grass along the edges of the plots grow into the grooves or channels, the trimming tool, when placed in the grooves, can be operated to cut the projecting blades of grass and thus produce a clean and straight edge for the plots. In view of the fact that grass cannot grow on the reduced edges of the pavement, the possibility of the grass growing across the grooves or channels and thus destroying the line of demarcation between the plots and pavement is reduced to a minimum.

Referring again to Figure 2, the curbing 18 is shown provided with a marginal recess 21, co-extensive in length with the curbing, and arranged to provide a groove or channel between the curbing and the adjacent edge of the parking 16, which provides the same advantages as described in connection with the grooves or channels 20.

Referring now to Figure 3, I have herein shown another form of edge spacer embodying my invention, in which a conventional form of pavement 22 is employed, the pavement being conventional in that its side edges are perpendicular. In this form of my invention trenches of suitable depth and width are dug in the plots 15 and 16 at the opposite edges of the pavement 22, and in these trenches spacing strips are deposited which have their upper edges disposed below the surface of the pavement to form grooves or channels 23 between the pavement and the grass plots 15 and 16. The spacing strips may be made of any suitable material, and in the present instance I have shown one strip 24 formed of wood and consisting of a beam of suitable dimensions to properly fit within the corresponding trench and in such manner that its upper edge is disposed below the surface of the pavement 22. The other spacing strip 25 is formed of cement which is adapted to be poured into the trench and properly tamped so that its upper edge is disposed below the surface of the pavement 22.

In Figure 3, 26 designates a trench provided between the parking 16 and a curbing 27, the latter being of conventional form. The trench 26 is adapted to be filled with cement to provide an intervening groove or channel between the plot 16 and the curbing in the same manner as that described in connection with the spacing strip 25.

Although I have herein shown and described only two forms of edge spacers for cultivating grass plots, embodying my invention, it is to be understood that various changes and modifications may be made herein without departing from the spirit of the invention and the spirit and scope of the appended claims.

What I claim is:

1. A pavement for use in connection with lawns and comprising a body of plastic material having its upper surface disposed approximately flush with the surface of an adjacent lawn section and spaced therefrom laterally, said body further having a lateral extension disposed in the intervening space between the said surfaces of the lawn and the body and extending upwardly to a position substantially flush with the surface of the ground and below the adjacent surfaces of the lawn and the pavement.

2. A pavement for use in connection with lawns and comprising a body of plastic material having its upper surface disposed approximately flush with the surface of an adjacent lawn section and provided in its upper marginal edge adjacent to the lawn with a groove or rabbet, the lower side of which is substantially flush with the adjacent surface of the ground, the said groove or rabbet being constructed to provide an intervening lateral space between the adjacent surfaces of the lawn and the pavement.

3. A pavement for use in connection with lawns and comprising a body of plastic material having its upper surface disposed approximately flush with the surface of an adjacent lawn section and provided in its upper marginal edge adjacent to the lawn with a longitudinal groove or rabbet extending throughout the length of the body and the lower side of which is substantially flush with the adjacent surfaces of the ground, the said groove or rabbet being constructed so as to provide an intervening lateral space between the adjacent surfaces of the lawn and the pavement.

BERNARD MacDONALD.